United States Patent [19]

Oishi et al.

[11] 4,300,729
[45] Nov. 17, 1981

[54] TAPE CLAMP FOR MAGNETIC TAPE MAGAZINE

[75] Inventors: Kengo Oishi; Osamu Suzuki, both of Odawara, Japan

[73] Assignee: Fuji Photo Film Co., Ltd., Minami-ashigara, Japan

[21] Appl. No.: 128,889

[22] Filed: Mar. 10, 1980

[30] Foreign Application Priority Data

Mar. 30, 1979 [JP] Japan .................. 54-41486[U]

[51] Int. Cl.³ ............................................ B65H 75/28
[52] U.S. Cl. ............................................. 242/74.1
[58] Field of Search ............... 242/74, 74.1, 74.2, 242/125, 125.1

[56] References Cited

U.S. PATENT DOCUMENTS

| | | | |
|---|---|---|---|
| 3,921,927 | 11/1975 | Esashi et al. | 22/74 |
| 3,990,733 | 11/1976 | Shiba et al. | 242/74 |
| 4,181,272 | 1/1980 | Shiba et al. | 242/74.1 |

*Primary Examiner*—John M. Jillions
*Attorney, Agent, or Firm*—Fleit & Jacobson

[57] ABSTRACT

A tape clamp to be fitted into a recess of a hub in a magnetic tape magazine to fix an end of a recording tape to the hub includes a body portion having a curved outer surface, a pair of lugs projecting from the inner surface of the body portion, and a pair of ribs, each rib connecting the free end of a lug and an intermediate point on the inner surface of the body portion. The ribs are inwardly and resiliently deflected when the tape clamp is fitted into the recess. The outer surface of the body portion has an inherent curvature slightly larger than that of the peripheral surface of the hub and is bowed to have a curvature substantially equal to that of the peripheral surface of the hub when the ribs are deflected.

5 Claims, 2 Drawing Figures

TAPE CLAMP FOR MAGNETIC TAPE MAGAZINE

BACKGROUND OF THE INVENTION

1. Field of the Invention

This invention relates to an improvement in a tape clamp for fixing an end of a magnetic recording tape to a hub of a magnetic tape magazine.

2. Description of the Prior Art

In a magnetic tape magazine, the ends of a magnetic recording tape are fixed to take-up and feed-out hubs by means of a tape clamp. Generally the tape clamp is resiliently press-fitted into a recess provided in the outer surface of the hub and an end of the magnetic recording tape is clamped between the hub and the tape clamp. Conventionally, the tape clamp comprises a body portion having an outer surface and a pair of lugs projecting from the inner surface of the body portion at its ends. Each lug is provided with an outwardly extending shoulder for engagement with a shoulder formed on the wall of the recess when the tape clamp is press-fitted into the recess, thereby holding the tape clamp within the recess. The tape clamp is designed so that the outer surface of the body portion is inherently flat and is bowed to have a curvature equal to that of the outer peripheral surface of the hub and merging thereinto when the tape clamp is press-fitted into the recess of the hub.

However, a body portion having a flat outer surface cannot easily assume a bowed shape wherein the outer surface has a curvature precisely equal to that of the peripheral surface of the hub.

If the curvature of the outer surface of the body portion differs from that of the peripheral surface of the hub, when the tape clamp is press-fitted into the recess of the hub, deviation from circularity of the tape-clamp-hub assembly is increased. The increased deviation from circularity of the assembly could give rise to physical strains in the magnetic recording tape wound therearound. Such physical strains in the magnetic recording tape could adversely affect the quality of reproduction. This is especially true in case of a high performance reproduction system. Although, the above problem may be partly solved by forming the body portion so that its outer surface is inherently curved, this approach would result in reduced tape clamping force since the tape clamping force of such a conventional tape clamp solely depends upon the resiliency or rebounding force of the body portion.

Further, in the conventional tape clamp, the lugs generally have a wall thickness substantially larger than that of the body portion. Therefore, as is well known in the art, a serious sink mark is apt to occur in the outer surface of the body portion when the tape clamp is formed by plastic injection molding. The sink mark also adversely aggravates the deviation from circularity of the tape-clamp-hub assembly.

SUMMARY OF THE INVENTION

The primary object of the present invention is to provide an improved tape clamp for a magnetic tape magazine which can reduce deviation from circularity of the tape-clamp-hub assembly of the magnetic tape magazine without reducing the tape clamping force.

Another object of the present invention is to provide an improved tape clamp for a magnetic tape magazine which can be formed by plastic injection molding without generating a serious sink mark in the outer surface thereof.

The tape clamp of the present invention, includes a body portion having a smooth outer surface. The outer surface of the body portion is inherently provided with a curvature which is slightly larger than that of the peripheral surface of a hub with which the tape clamp is to be engaged. A pair of lugs extend from the inner surface of the body portion one at either end thereof. The tape clamp is further provided with a pair of ribs, one of which extends between the free end of one of the lugs and an intermediate point on the inner surface of the body portion between the ends thereof, and the other of which extends between the free end of the other lug and another intermediate point on the inner surface of the body portion. Preferably, these intermediate points on the inner surface of the body portion are equally spaced from the center of the body portion.

The ribs are inwardly and resiliently compressed when the tape clamp is forced into a recess of a hub and the tape clamping force of the tape-clamp-hub assembly is mainly provided with the resiliency or rebounding force of the ribs. The outer surface of the body portion is further slightly bowed to have a curvature substantially equal to that of the peripheral surface of a hub when the tape clamp is forced into a recess of the hub. Since the outer surface of the body portion need not be bowed to a large degree, the curvature thereof can be readily controlled. Still, sufficient tape clamping force can be provided by virtue of the ribs as described above.

Further, in the tape clamp of this invention the lugs and the part of the body portion adjacent to the lugs can be reduced in thickness since the tape clamping force is mainly provided by the ribs. Accordingly, the problem of the sink mark in the outer surface of the body portion can be reduced.

DESCRIPTION OF THE PREFERRED EMBODIMENT

Figure 1:
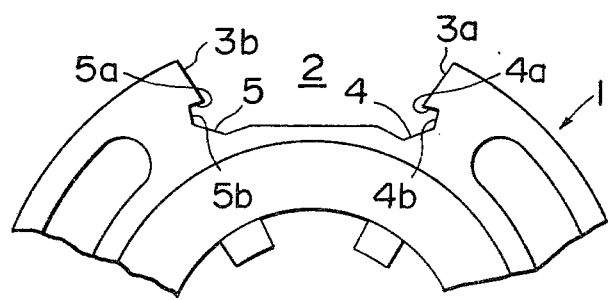
FIG. 1 is a fragmentary plan view of a hub into which a tape clamp of the present invention is to be fitted.

Referring to FIG. 1, a hub 1 which is to be associated with a tape clamp in accordance with an embodiment of the present invention to clamp one end of a magnetic recording tape (not shown) is provided with a recess 2 in the peripheral surface thereof. The recess 2 has a pair of outwardly inclined opposite side walls 3a and 3b. The side walls 3a and 3b are respectively provided with cut-off portions 4 and 5 adjacent to the inner end thereof to form engaging shoulders 4a and 5a.

Figure 2:
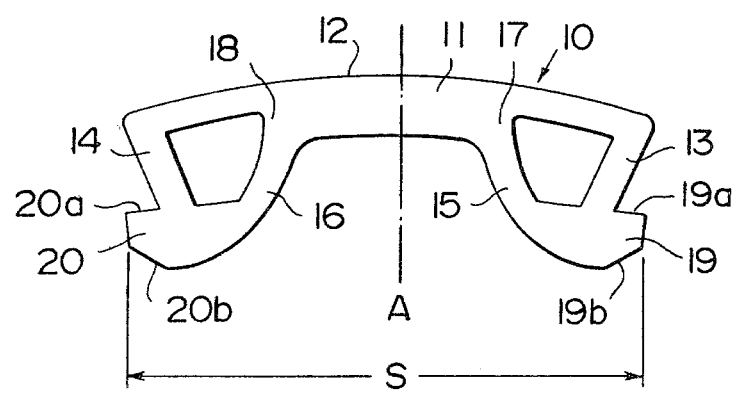
FIG. 2 is an enlarged plan view of a tape clamp in accordance with an embodiment of the present invention.

Referring to FIG. 2, a tape clamp 10 of this embodiment includes a body portion 11 having a curved outer surface 12. The outer surface 12 has an inherent curvature slightly larger than that of the peripheral surface of the hub 1. A pair of inwardly inclined lugs 13 and 14 extend from the inner surface of the body portion 11, one at each of its ends. A pair of ribs 15 and 16 respectively connect the free end of the lugs 13 and 14, and intermediate points 17 and 18 on the inner surface of the body portion 11. The intermediate points 17 and 18 are equally spaced from the lateral axis A of the body portion 11. Preferably, the distances between the points 17 and 18, between the point 17 and the adjacent end of the body portion 11, and between the point 18 and the adjacent end of the body portion 11 are substantially equal to each other.

The ribs 15 and 16 have extensions 19 and 20, respectively. Each of the extensions 19 and 20 extends outwardly to form an engaging shoulder 19a and 20a which are to be engaged with said shoulders 4a and 5a, respectively, of the hub 1 when the tape clamp 10 is forced into the recess 2, to hold the tape clamp 10 within the recess 2.

The extensions 19 and 20 are further provided with inwardly inclined abutment surfaces 19b and 20b, respectively.

When the tape clamp 10 is forced into the recess 2 of the hub 1, the abutment surfaces 19b and 20b are respectively engaged with the inclined side walls 3a and 3b, whereby the ribs 15 and 16 are inwardly and resiliently deflected or compressed as the tape clamp 10 is pushed into the recess 2. As the upper edges of the extensions 19 and 20 clear the lower edges of the side walls 3a and 3b, the ribs 15 and 16 rebound outwardly, whereby the shoulders 19a and 20a are brought into engagement with the shoulders 4a and 5a, respectively.

When the ribs 15 and 16 are compressed, the body portion 11 is bowed so that the radius of curvature of the outer surface thereof is reduced. The space between the side wall 4b of the cut-off portion 4 and the side wall 5b of the cut-off portion 5 is dimensioned to be slightly smaller than the span S i.e. the space between the free end of the extensions 19 and 20 of the ribs 15 and 16. Accordingly, the ribs 15 and 16 are kept compressed as long as the tape clamp 10 is in the recess 2, and the tape clamping force is mainly provided by the rebounding force or resiliency of the ribs 15 and 16 as described above.

The inherent curvature of the outer surface 12 of the body portion 11, i.e. the curvature of the outer surface 12 in its released condition as shown in FIG. 2 is selected depending on the dimensional relation between the space of the side walls 4b and 5b and the span S of the ribs 15 and 16 so that the curvature is made equal to the curvature of the peripheral surface of the hub 1 when the tape clamp 10 is fitted into the recess 2 of the hub 1. The curvature is generally selected to be 1.2–1.6 times as large as that of the peripheral surface of the hub 1.

Further as can be seen from FIG. 2, the wall thickness of the lugs 13 and 14, and the part of the body portion 11 between said intermediate points 17 and 18 and the respective adjacent ends, is about half as large as that of the part between the intermediate points 17 and 18. Accordingly, there is no serious problem of a sink mark occurring in the outer surface of the body portion 11 during molding of the tape clamp 10.

The following table shows the depth of the sink mark generated in the outer surface of the tape clamp 10 of the present invention, and the deviation from circularity and the tape clamping force of the tape-clamp-hub assembly in accordance with the present invention in comparison with those of earlier tape-clamp-hub assemblies.

|  | this invention | earlier hub assemblies |
| --- | --- | --- |
| *1 sink mark (mm) | 0.03 | 0.06–0.1 |
| *2 deviation from circularity (mm) | 0–0.04 | 0.06–0.1 |
| *3 tape clamping force (Kg) | 1.6–2.0 | 1.6–2.0 |

*1 Depth of sink mark was measured by a profile gauge manufactured by Mitsutoyo Manufacturing Co., Ltd., Model CA-105 Contracer.
*2 Deviation from circularity was measured by a roundness measuring instrument manufactured by Mitsutoyo Manufacturing Co., Ltd., Model RA-1.
*3 Tape clamping force was measured by a circular spring-type tension gauge manufactured by Otsuka Meter Manufacturing Co., Ltd. (maximum measurable value: 3Kg)

We claim:
1. A tape clamp to be fitted into a recess provided in the peripheral surface of a hub in a magnetic tape magazine to fix an end of a magnetic recording tape to the hub, comprising a body portion having a curved outer surface, a pair of lugs projecting from the inner surface of the body portion one each at its opposite ends, and a pair of ribs, each rib connecting a free end of a lug and an intermediate point on the inner surface of the body portion between the ends thereof, the ribs being inwardly and resiliently deflected when the tape clamp is fitted into said recess, said curved outer surface of the body portion having an inherent curvature slightly larger than that of the peripheral surface of the hub and being further bowed to have a curvature substantially equal to that of the peripheral surface of the hub when the ribs are deflected by fitting the tape clamp into the recess of the hub.

2. A tape clamp as defined in claim 1 in which said two intermediate points of the inner surface of the body portion are equally spaced from the lateral axis of the body portion.

3. A tape clamp as defined in claim 2 in which the distance between the two intermediate points is equal to the distance between each intermediate point and the adjacent end of the body portion.

4. A tape clamp as defined in claim 1 in which the wall thickness of the lugs and the part of the body portion between each intermediate point and the adjacent end of the body portion is smaller than that of the part of the body portion between said intermediate points.

5. A tape clamp as defined in any one of claims 1 to 4 in which the inherent curvature of the outer surface of the body portion is 1.2–1.6 times as large as that of the peripheral surface of the body portion.

* * * * *